United States Patent [19]

Coenen et al.

[11] 4,115,530

[45] Sep. 19, 1978

[54] PROCESS FOR OBTAINING GASEOUS HYDROGEN CHLORIDE FROM DILUTE, AQUEOUS HYDROCHLORIC ACID

[75] Inventors: Alfred Coenen; Kurt Kosswig; Günter Prominski, all of Marl, Fed. Rep. of Germany

[73] Assignee: Chemische Werke Hüls AG, Marl, Fed. Rep. of Germany

[21] Appl. No.: 815,761

[22] Filed: Jul. 14, 1977

[30] Foreign Application Priority Data

Jul. 27, 1976 [DE] Fed. Rep. of Germany ........ 2633640

[51] Int. Cl.$^2$ .............................................. C01B 7/08
[52] U.S. Cl. ...................... 423/488; 203/12; 203/14; 203/28; 203/38; 203/39
[58] Field of Search ..................... 423/488, 481, 658.5; 203/12, 14, 28, 38, 39, DIG. 6

[56] References Cited

U.S. PATENT DOCUMENTS

| 3,186,809 | 6/1965 | Kreevoy et al. ................. 423/488 X |
| 4,036,939 | 7/1977 | Duhayon et al. .................... 423/488 |

FOREIGN PATENT DOCUMENTS

| 41-17,046 | 9/1966 | Japan ...................................... 423/488 |
| 48-66,095 | 10/1973 | Japan ...................................... 423/488 |
| 48-67,191 | 9/1973 | Japan ...................................... 423/488 |

*Primary Examiner*—O. R. Vertiz
*Assistant Examiner*—Thomas W. Roy
*Attorney, Agent, or Firm*—Gilbert L. Wells

[57] ABSTRACT

Process for the production of gaseous hydrogen chloride by extraction of dilute aqueous hydrochloric acid with amines.

(a) The aqueous hydrochloric acid is extracted with an amine or with a mixture of an amine and an inert organic solvent which is immiscible with water and has a lower boiling point than the amine employed, the amines utilized being tertiary alkyl amines, tertiary aryl dialkyl amines, secondary arylalkyl amines, primary alkylaryl amines, or mixtures thereof, which contain 14-32 carbon atoms in the nitrogen-bound side chains, and among these at most one nitrogen-bound methyl group and at least one aliphatic residue containing at least 6 carbon atoms, and wherein the acid constant $K_a$ of the amine is smaller than $10^{-3}$.

(b) An inert, water-immiscible organic solvent which has a lower boiling point than the amine employed is added to the extract, unless the solvent has already been added in stage (a).

(c) The extract is distilled, the vapors thus-formed are condensed, the water is continuously separated from the two-phase condensate, and the organic phase is returned into the distillation process.

(d) After removal of the water, the extract is distilled under reflux at sump temperatures of between 100° and 250° C., and the gaseous hydrogen chloride thus liberated at the head of the column is withdrawn.

22 Claims, No Drawings

PROCESS FOR OBTAINING GASEOUS HYDROGEN CHLORIDE FROM DILUTE, AQUEOUS HYDROCHLORIC ACID

CROSS-REFERENCE TO A RELATED APPLICATION

Applicants claim priority under 35 USC 119 for application P 26 33 640.3 filed July 27, 1976 in the Patent Office of the Federal Republic of Gemany.

BACKGROUND OF THE INVENTION

In many technical processes, hydrogen chloride is obtained as a by-product in the form of a more or less strongly diluted, aqueous hydrochloric acid, for which there is merely a limited range of technical usefulness.

In order to be able to utilize the hydrogen chloride present in the form of such a dilute, aqueous hydrochloric acid as a chemical raw material, for example for the manufacture of vinyl chloride, ethyl chloride, chloroprene, or chlorosulfonic acid, this compound must be isolated as an anhydrous gas.

A maximally 20.2% strength hydrochloric acid can be obtained from dilute, aqueous hydrochloric acid solutions by distillation under normal pressure; this hydrochloric acid forms in this concentration an azeotrope boiling at 109° C. Although the composition of the azeotrope can be altered by varying the pressure, so that finally also gaseous hydrogen chloride could be produced from a dilute hydrochloric acid solution by combining two columns operated under different pressures, such a procedure is unfeasible on a large technical scale, because large quantities of water must be vaporized with the expenditure of a large amount of energy. Likewise uneconomical are methods wherein the hydrogen chloride is displaced from the aqueous phase by salts, such as calcium chloride or magnesium chloride, or wherein the water is engaged, for example, by concentrated sulfuric acid, because these additives must be regenerated in a subsequent stage under evaporation of the water.

It has, therefore, been suggested to extract aqueous hydrochloric acid solutions with special solvents, e.g. with pentanols, and to obtain the hydrogen chloride thereafter as concentrated hydrochloric acid (E. D. Crittenden, A. N. Hixson, Ind. Eng. Chem. 46 [1954] : 265-274). Since the pentanol phase absorbs considerable amounts of water in addition to the hydrogen chloride, however, only minor amounts of anhydrous hydrogen chloride are obtained by distillation; the larger portion of the hydrogen chloride again appears as an azeotrope with water.

The distribution coefficient of hydrogen chloride between isoamyl alcohol and water ranges, in dependence on the concentration, between 0.13 and 0.32 with 5% and 15% of hydrogen chloride in the water, respectively; in other words, only the smaller portion of the hydrogen chloride enters the extract phase with identical amounts of extract and raffinate.

Suitable extractants with far more favorable distribution coefficients are longer-chain amines, the hydrochlorides of which, due to the hydrophobia of the alkyl chains, are no longer soluble in water, or exhibit an only very low solubility therein. Such amines, e.g. methyldioctylamine (C.A. 1964 : 10102h), trilaurylamine (C.A. 61 : 10092 C), trioctylamine (C.A. 71 : 85106 C), N-octylaniline (C.A. 68 : 131337 C), hexadecylamine (C.A. 79 : 10397 e), are capable, optionally in the presence of further inert organic solvents, such as benzene, xylene, or aliphatic hydrocarbons in the benzine range, of almost quantitatively extracting hydrogen chloride from aqueous solutions. Therefore, by means of such an extraction with amines, a process is available which is readily usable from a technical viewpoint, for almost quantitatively removing hydrogen chloride from its aqueous solution and thus to obtain a practically acid-free, aqueous raffinate. However, no simple technical method has been known heretofore in order to obtain hydrogen chloride from the thus-produced extracts.

It is known that aniline can likewise be utilized for extracting a portion of the hydrogen chloride from an aqueous hydrochloric acid solution (N. V. Sidgwick, P. Pickford, and B. H. Wilsdon, J. Chem. Soc. 99 [1911] : 1122), thus producing the hydrochloride of aniline. It is known that aniline hydrochloride decomposes, at its boiling point of 245° C. under normal pressure, completely into its components aniline and hydrogen chloride. However, it is impossible to separate the hydrogen chloride from the vapor mixture with simple means, for example by condensation of the aniline contained therein; this is so, because during the cooling of the vapor mixture, a complete reformation of the aniline hydrochloride takes place.

Due to the lack of a usable method for separating the hydrochlorides of amines into their components, the methods for the extraction of hydrogen chloride with amines have heretofore been limited to the regeneration of the amines, by treating the thus-obtained ammonium chloride with alkalis, wherein the amine was liberated but the hydrogen chloride was bound as the salt (for example E. L. Smith, J. E. Page, J. Soc. Chem. Ind. 67 (1948) : 48.

In summation, it is to be noted that up to the present time, there has not been known any method, which can be conducted with an economically feasible expenditure, for obtaining gaseous hydrogen chloride with high yields from aqueous, particularly diluted hydrochloric acid solutions.

SUMMARY OF THE INVENTION

The problem has been to discover such a process. This problem has now been solved by providing a process for the production of gaseous hydrogen chloride by extraction of dilute, aqueous hydrochloric acid with amine, characterized in that:

(a) the aqueous hydrochloric acid is extracted with an amine or with a mixture of an amine and an inert solvent which is immiscible with water and has a lower boiling point than the amine employed, the amines utilized being tertiary alkyl amines, tertiary aryl dialkyl amines, secondary arylalkyl amines, primary alkylaryl amines, or mixtures thereof, which contain 14–32 carbon atoms in the nitrogen-bound side chains, and among these at most one nitrogen-bound methyl group and at least one aliphatic residue containing at least 6 carbon atoms, and wherein the acid constant $K_a$ of the amine is smaller than $10^{-3}$;

(b) an inert, water-immiscible solvent which has a lower boiling point than the amine employed is added to the extract, unless the solvent has already been added in stage (a);

(c) the extract is distilled, the thus-formed vapors are condensed, the water is continuously separated from the two-phase condensate, and the organic phase is returned into the distillation process; and (d) after removal of the water, the extract is distilled under reflux at sump temperatures of between 100° C. and 250° C., and the gaseous hydrogen chloride thus liberated at the head of the column is withdrawn.

DESCRIPTION OF THE PREFERRED EMBODIMENTS

The amines suitable for the process of this invention are tertiary alkyl amines, tertiary aryl dialkyl amines, secondary arylalkyl amines, primary alkylaryl amines, as well as optionally mixtures of these amines. The amines must have 14–32 carbon atoms in the nitrogen-bound side chains; one of the aliphatic, nitrogen-bound side chains must have at least 6 carbon atoms, i.e., it must be a cyclohexyl, hexyl, or isohexyl residue, and the amino group is allowed to carry at most one methyl group.

The dissociation constant $K_a$ of the equilibrium reaction:

$$NR_3H^+ + H_2O \rightleftarrows NR_3 + H_3O^+$$

must be smaller than $10^{-3}$ to ensure an adequate extraction of the hydrogen chloride. The dissociation constant $K_a$ can be derived, for many amines, from the pertinent literature, for example Handbook of Chemistry and Physics, 51st ed. (1970–71), pp. D-117 et seq.

Suitable amines are, for example, the following: trihexylamine, triheptylamine, trioctylamine, cyclohexyldiisooctylamine, tri-2-ethylhexylamine, di-2-ethylhexylmethylamine, didecylethylamine, tridodecylamine, didodecylmethylamine, dodecyldiisopropylamine, dodecyldibutylamine, dodecyldiisobutylamine, dodecylisobutylmethylamine, diisopentadecylmethylamine, diisopentadecylethylamine, diisopentadecylisopropylamine; N-octylaniline, N-2-ethylhexylaniline, N-laurylaniline, N-isotridecylaniline, N-isopentadecylaniline, N-stearylaniline; N,N-dihexylaniline, N,N-dioctylaniline, N,N-di-2-ethylhexylaniline, N,N-didodecylaniline, N-dodecyl-N-methylaniline, N-dodecyl-N-ethylaniline, N-dodecyl-N-hexylaniline; N,N-dihexyl-p-toluidine, N,N-di-2-ethylbutyl-p-toluidine, N,N-diheptyl-p-toluidine, N,N-dioctyl-p-toluidine, N,N-di-2-ethylhexyl-p-toluidine.

The amines utilized for the extraction are to contain about 14 to 32 carbon atoms in the side chains. It proved to be advantageous to use the amine during extraction in an amount corresponding stoichiometrically at least to the amount of the hydrogen chloride to be extracted. With an increasing carbon atom number in the side chains, the amount by weight to be utilized for the extraction of a specific amount of hydrogen chloride thus increases accordingly. On account of the quantities of material to be transported, increasing with the rising number of carbon atoms, an economical limit is set with respect to such increase. On the other hand, the solubility of the amines and/or their hydrochlorides in water, though being very minor, increases with a decreasing carbon atom number in the side chains.

Since the amine dissolved in the aqueous phase, though only in a very low concentration, is lost, or must be recovered by another, expensive operation, economical considerations will tend toward selecting amines having at least 14 carbon atoms in the side chains.

Secondary and primary aliphatic amines are less suitable for the process of this invention. Although these amines are suitable for the extraction of hydrogen chloride just as the amines mentioned hereinabove, it has been found that the separation of hydrogen chloride from such extracts by means of rectification requires temperatures which are so high that the amines begin to disintegrate. For this reason, N,N-dimethylalkyl amines are likewise unsuitable for the process of the present invention.

For purposes of extraction, the amine is employed in an amount suitably equivalent to the quantity of hydrogen chloride to be extracted. Although it is known that amine solutions are also capable of dissolving a multiple of the stoichiometric amount of hydrogen chloride, the distribution between the aqueous and organic phases then becomes unfavorable, and too much hydrogen chloride remains in the aqueous phase. In general, a quantity of amine lying slightly above the equivalent amount, i.e., 5–10%, is sufficient to remove more than 90% of the hydrogen chloride from the aqueous phase with a one-time extraction.

It has furthermore been found that addition compounds of amine and hydrogen chloride release hydrogen chloride, upon the absence of water at higher temperatures, in the presence of organic, polar, as well as apolar, water-immiscible solvents having a higher vapor pressure than the amine employed. Of course, with the use of amine mixtures, the solvents utilized must, under corresponding conditions, have a higher vapor pressure than the amine contained therein having the highest vapor pressure.

The solvents used in this connection are organic liquids which, under the conditions of the process, are inert with respect to water, hydrogen chloride, amines, and temperature load. Suitable for this purpose are, in particular, straight-chain or branched, aliphatic or cycloaliphatic, aromatic or araliphatic hydrocarbons of 6–20 carbon atoms, as well as mixtures of these compounds, or corresponding petroleum fractions, for example, decane, tetralin, decahydronaphthalene, tetradecane, benzene, toluene, xylene, durene, isobutylbenzene, pentylbenzene, or dodecylbenzene. However, it is also possible to utilize straight-chain or cyclic ethers of 6–20 carbon atoms, such as, for example, dibutyl ether or hexylmethyl ether, derivatives of tetrahydrofuran and -pyran, and of 1,4-dioxane. Furthermore suitable are ketones of 6–20 carbon atoms which are branched in the α-position (incapable of condensation), such as diisopropyl ketone, cyclic ketones of 6–20 carbon atoms, such as 2,6-dimethylcyclohexanone, and also benzene derivatives, such as chloro-, dichloro-, or nitrobenzene. Among the unsaturated or saturated aliphatic hydrocarbons, only perchlorinated compounds are suitable; chloroaliphatics, which still carry hydrogen atoms as substituents, can split off hydrogen chloride under the influence of the amine.

Alcohols and esters cannot be employed for the proces of this invention, inasmuch as they are capable of reacting with hydrochloric acid or hydrogen chloride or amine.

The addition of the organic solvent is an indispensable step for splitting off hydrogen chloride from the thus-formed ammonium compound. The solvent can be added already in the extraction stage together with the amine; however, it is also possible to add the solvent to the extract only after the extraction.

The hydrogen chloride is split off from the solvent-containing extract by thermal decomposition. The conductance of the thermal decomposition is very simple: The solution of the amine addition compound is brought to boiling by heating in a container provided with a column. At the head of the column, the vapors, consisting primarily of the solvent, are condensed in the usual manner and returned as reflux to the column. During this procedure, the hydrogen chloride contained in the vapors and undissolved by the condensed solvent simultaneously escapes from the condensation zone. To accelerate the hydrogen chloride formation, the split-off hydrogen chloride can be expanded to a lower pressure downstream of the condenser or it can be discharged with the aid of an inert gas stream. Suitable inert gases are nitrogen, furthermore substances gaseous under the ambient conditions, such as, for example, ethylene, which are to be reacted with hydrogen chloride in a subsequent stage.

The splitting off of the hydrogen chloride is dependent on the condition that the solution of the amine-hydrogen chloride addition compound utilized be anhydrous. For it has been found that solutions obtained during the extraction of aqueous hydrochloric acid contain water in all cases, which prevents the liberation of gaseous hydrogen chloride in the above-indicated mode of operation. A more exact investigation of the processes taking place during the rectification showed that primarily and initially only solvent and water are evaporated from a homogeneous system in the boiling condition, consisting of the components amine, hydrogen chloride, solvent, and water, at least in those cases wherein the amine is present with respect to the hydrogen chloride in at least a stoichiometric quantity. The liberation of hydrogen chloride from this system begins only at the time the latter has been freed of water with the aid of the aforementioned distillation step, in such a way that the water is separated conventionally from the condensate and, as the reflux, only the solvent freed of the water is recycled to the column.

The solvent must exhibit a higher vapor pressure than the amine employed, along the lines that the boiling point difference between the solvent and the amine is at least 20° C., preferably 30° C. and thereabove, in order to keep the required expenditure for the rectification within reasonable limits.

The water as well as the hydrogen chloride are separated by distillation and/or rectification. In a first stage, the water is driven over with the solvent as a hetero azeotrope. From the two-phase condensate, the water is continuously separated, and the organic phase is reintroduced into the distillation process.

The separation of the water from the thus-condensed vapors must be executed at maximum speed, in order to avoid a dissolution of the following hydrogen chloride in the condensed water. After the separation of the water, the distillation is carried out under total reflux of the condensed solvent; the hydrogen chloride not condensed and not dissolved in the condensed solvent is withdrawn in the gaseous phase. For this purpose, it is advantageous to expand the hydrogen chloride into a zone of lower pressure, in order to ensure a steady flow of the thus-escaping hydrogen chloride. The hydrogen chloride can, of course, also be discharged from the condensation zone by a stream of a gas inert under the conditions ambient at the head of the column, such as nitrogen or ethylene. It is, of course, also possible to separate corresponding extracts, obtained in some other way than by the extraction of aqueous hydrochloric acid, into hydrogen chloride and amine in accordance with the process of this invention.

After the hydrogen chloride has been split off, the thus-regenerated amine-solvent mixture can be directly recycled into the extraction stage. Of course, a separation into amine and solvent by distillation is likewise feasible.

The distillation and rectification to remove water and split off hydrogen chloride can be operated under subatmospheric pressure, normal pressure, and excess pressure. In general, the process will be conducted at normal pressure or under a slight excess pressure, e.g. 1 bar; the latter case is utilized to avoid a compression stage for the transport of the hydrogen chloride into a subsequent reaction stage.

It has been found that the splitting-off velocity of the hydrogen chloride from the solution distilled in the anhydrous state rises with an increasing temperature in the boiling sump mixture. The temperature in the sump is to be between 100° and 250° C., preferably between 120° and 230° C. At temperatures of below 100° C., the hydrogen chloride cleavage takes place very slowly; at temperatures of above 250° C., an increasing decomposition of the amines must be expected, for example in accordance with the equation: $R_3N + HCl \rightarrow R_2NH + RCl$. A minimizing of the amine loss, however, is essential for the economical conductance of the process.

The sump temperature desired within the predetermined range is affected by the selection of the solvent, by the quantitative ratio between solvent and amine, and by the operating pressure.

The ratio between solvent and amine can be varied within wide limits of 10 to 0.1. In general, a weight ratio of solvent to amine of about 1:1 is advantageous. With the use of amines ranging with respect to the number of carbon atoms at the lower limit, the use of a larger amount of solvent is recommended in order to maintain the solubility of the amine and/or of its salt in the aqueous phase at a minimum, even though such solubility is unavoidable in trace amounts. In case of amines with a carbon atom number lying at the upper limit, it can likewise be advantageous to utilize a larger quantity of solvent as compared to the amine, in order to keep the temperature in the boiling sump mixture at below 250° C. or 230° C., respectively.

Even with the use of amines, the hydrochlorides of which tend toward crystallization, it can be advantageous purely for reasons of process technology to utilize in the extraction stage larger amounts of solvents to avoid precipitation of the salts. The crystallized amine hydrochlorides, however, can also be filtered off and introduced into the rectification in the solid phase.

Finally, with the use of amines, the hydrochlorides of which no longer crystallize at all, or crystallize only with great difficulties, it can be advantageous to use only a very small amount of solvent in the extraction stage, or to make do without such a solvent at all in the extraction stage.

The temperature during extraction is uncritical. To avoid vaporizations and/or excess pressures, temperatures of below 60° C. are preferred. The lower temperature limit can be determined by the separation of a component of the mixture by crystallization.

The process of this invention is particularly suitable for obtaining hydrogen chloride from hydrochloric acid solutions from which gaseous hydrogen chloride cannot be produced by distillation under normal conditions, i.e., for hydrochloric acid solutions lower than 20%. These solutions can furthermore contain inorganic neutral salts; the electrolyte effect of such salts can improve the distribution of the hydrogen chloride between the aqueous phase and the organic phase in favor of the process, and can also accelerate the phase separation after the intermixing in the extraction stage.

The hydrochloric acid solutions used in the present invention have a hydrochloric acid concentration or about 2 to 20 percent by weight and preferably about 5 to 15 percent by weight.

EXAMPLE 1 (Comparative Example)

A round flask with a magnetic agitator having a capacity of ½ liter and equipped with a 30 cm. Raschig ring column and a reflux condenser is charged with 97 g. (0.25 mole) of tri-2-ethylhexylammonium chloride, prepared by introducing an equivalent amount of hydrogen chloride into an ether solution of the amine and subsequent removal of the ether by evaporation; then, the flask is heated to 180° C. Through a lateral connecting pipe, 10 l. of nitrogen per hour is introduced into the flask. The nitrogen passing through the cooler is conducted through two series-connected washing bottles charged with 0.5N sodium hydroxide solution. By determining the sodium hydroxide solution in the washing bottles by titrimetry, the amount of thus-produced hydrogen chloride can be detected at any time. In this experiment, no hydrogen chloride is split off even after a duration of 6 hours.

EXAMPLE 2

In an apparatus in accordance with Comparative Example 1, 97 g. (0.25 mole) of tri-2-ethylhexylammonium chloride is combined with 88 g. of xylene and heated to reflux while passing 10 l. of nitrogen per hour through the reaction mixture. During this step, a sump temperature of 135° C. is obtained. The amount of 0.24 mole of hydrogen chloride split off after conducting the experiment for three hours and bound in the sodium hydroxide solution of the washing bottles corresponds to a yield of 96%.

EXAMPLE 3 (Comparative Example)

In a separating funnel, 68.5 g. of an aqueous solution containing 6.5 g. of sodium chloride and 9.1 g. (0.25 mole) of hydrogen chloride is mixed by shaking with 88 g. (0.25 mole) of tri-2-ethylhexylamine and 88 g. of xylene and then left to phase separation. Yield: 190 g. of supernatant organic phase and 53 g. of aqueous phase. The organic phase contains 8.5 g. of hydrogen chloride, the aqueous phase contains 0.6 g. of hydrogen chloride.

The organic phase is then heated in an apparatus according to Comparative Example 1 to reflux while passing 10 l. of nitrogen per hour therethrough. During this step, a temperature of 130°–135° C. is obtained in the flask. After 6 hours, 0.5 g. of hydrogen chloride is found in the washing bottles, i.e., 6% of the amount utilized for the rectification.

EXAMPLE 4

Comparative Example 3 is repeated, except that a water trap is inserted between the distillation column and the condenser. As soon as the first condensate returns via the trap into the column, water is precipitated therein, which is separated. In total, 5.5 g. of water is obtained containing 0.5 g. of residual hydrogen chloride. After separation of the water, large amounts of hydrogen chloride leave the condenser in the nitrogen stream. After 3 hours, 7.6 g. of hydrogen chloride has been collected in the washing bottles. Together with the hydrogen chloride collected in the separated water, this is 95% of the expected quantity. EXAMPLES 5–11

In these examples, the production of hydrogen chloride with the aid of tri-2-ethylhexylamine and various solvents is to be demonstrated. Respectively 68.5 g. of an aqueous solution containing 6.5 g. of sodium chloride and 9.1 g. (0.25 mole) of hydrogen chloride is extracted with a mixture of 88 g. (0.25 mole) of tri-2-ethylhexylamine and 88 g. of the solvent. The extract is then introduced into a round flask equipped with a column, a water trap, and a condenser. Over the surface of the liquid, 10 l. of nitrogen per hour is introduced into the flask via a connecting pipe. The gas passing through the reflux condenser is conducted through two washing bottles charged with N/2 sodium hydroxide solution to absorb hydrogen chloride. By back titration, the amount of the thus-produced hydrogen chloride can be determined at any time. Table 1 shows the results, wherein the amount of hydrogen chloride is indicated which evolves during the rectification after predetermined time periods. This time period is calculated starting with the instant at which the water separation is terminated and the evolution of hydrogen chloride commences. Experiments 5–9 were interrupted after 4 hours, and experiments 10 and 11 after one hour. It can be seen that the hydrogen chloride evolution also depends on the nature of the solvent, but primarily on the temperature of the boiling mixture. Thus, with the use of diisopropyl ketone as the solvent, of a possible 8.7 g. of hydrogen chloride, only 2.8 g. of hydrogen chloride has been separated after 4 hours at a sump temperature of 139° C., whereas with the use of dibutyl ether as the solvent, at a sump temperature of 168° C., already the entire quantity has been separated.

TABLE 1

| | | Extraction | | | | | Rectification | | | | | | | |
|---|---|---|---|---|---|---|---|---|---|---|---|---|---|---|
| Example | Solvent | g. Lower Phase | g. Upper Phase | g.HCl Lower Phase | g.HCl Upper Phase | g. Aqueous Phase | g.HCl in Aqueous Phase | gHCl Aft. 10 min. | gHCl Aft. 20 min. | gHCl Aft. 30 min. | gHCl Aft. 1 Hour | gHCl Aft. 2 Hours | gHCl Aft. 3 Hours | gHCl Aft. 4 Hours | gHCl Gas + Aqu. | Sump Temp. °C |
| 5 | Ligroin(*) | 55 | 203 | 0.9 | 8.2 | 4.2 | 0.1 | | | | | 0.9 | | 1.9 | 2.0 | 100 |
| 6 | Diisopropyl ketone | 52 | 191 | 0.4 | 8.7 | 7.0 | 0.2 | | | | 0.6 | 1.5 | 2.0 | 2.6 | 2.8 | 139 |
| 7 | Chlorobenzene | 55 | 189 | 0.4 | 8.7 | 3.4 | 0.3 | | 1.0 | 1.0 | 1.6 | 3.1 | 4.6 | 6.0 | 6.3 | 145 |
| 8 | Dibutyl ether | 55 | 189 | 0.7 | 8.3 | 5.2 | 0.5 | | 1.0 | 1.6 | 4.4 | 7.5 | 7.7 | 7.8 | 8.3 | 158 |
| 9 | Anisole | 52 | 191 | 0.4 | 8.7 | 7.0 | 0.4 | | 0.7 | 1.2 | 3.5 | 5.6 | 6.4 | 7.0 | 7.7 | 167 |
| 10 | tert.-Pentylbenzene | 53 | 190 | 0.6 | 8.5 | 6.1 | 0.5 | | 7.2 | 7.5 | 7.6 | | | | 8.1 | 205 |
| 11 | 2-Ethylhexylisobutyl ether | 57 | 187 | 1.8 | 7.3 | 6.8 | 0.8 | | 0.7 | 1.1 | 5.5 | | | | 6.3 | 215 |

(*) 100g.

EXAMPLE 12

139.0 g. of an aqueous solution containing 13.2 g. of sodium chloride and 18.2 g. (0.50 mole) of hydrogen chloride is extracted with a liquid mixture of 177.0 g. (0.50 mole) of tri-2-ethylhexylamine and 120.0 g. of xylene, thus obtaining 320.0 g. of an organic phase, as well as 115.1 g. of an aqueous phase. The latter still contains 1.4 g. of hydrogen chloride which, in a second stage, can be extracted in a practically quantitative way. The organic phase, 320.0 g., was heated to reflux in an apparatus according to Example 4, thus obtaining 9.0 g. of an aqueous distillate containing 0.6 g. of hydrogen chloride, thereafter 15.7 g. of gaseous hydrogen chloride, i.e. 93%, based on the extracted hydrogen chloride. The hydrogen chloride contained in the aqueous phase can be recovered by recycling into the extraction stage, whereby the yield is increased to 97%.

The content of the flask remaining after the distillation, namely 294.3 g., is reused for the extraction of 139.0 g. of the above-mentioned hydrochloric acid solution, which contains sodium chloride. The extract is again worked up by distillation and rectification. This process is repeated four times. In each case, respectively about 10 g. of an aqueous distillate is obtained with 1 g. of hydrogen chloride and 15–16 g. of gaseous hydrogen chloride. Except for minor mechanical losses, the yield of hydrogen chloride, based on the extract phase, is practically quantitative. In the aqueous raffinate phase there remains respectively 1.0 to 1.5 g. of hydrogen chloride in solution, corresponding to an extraction rate of 92–95%.

EXAMPLE 13 (Comparative Example)

91.0 g. of an aqueous solution containing 8.7 g. of sodium chloride and 12.1 g. (0.33 mole) of hydrogen chloride is extracted with a liquid mixture of 80.3 g. (0.33 mole) of di-2-ethylhexylamine and 80.0 g. of tetradecane. The hydrogen chloride passes over practically quantitatively into the organic phase; only 40 mg. is found in the aqueous solution. The upper phase is heated to reflux in accordance with the disclosure of Example 4 while passing 10 l. of nitrogen per hour therethrough. In this way, 10.8 g. of an aqueous condensate is obtained wherein 52 mg. of hydrogen chloride can be detected. Thereafter, the mixture is heated for 5 hours under total reflux at a sump temperature of 255° C. During this time, a total of 0.9 g. of hydrogen chloride is obtained in the washing bottles.

EXAMPLE 14 (Comparative Example)

A mixture containing 55.6 g. (0.43 mole) of 2-ethylhexylamine and 4.4 g. (0.12 mole) of hydrogen chloride is heated to reflux for 3 hours while passing 10 l. of nitrogen per hour through the reaction mixture. A sump temperature of 170° C. is thus obtained. There is no splitting off of hydrogen chloride. Thereafter, 50 g. of xylene is added. After 4½ hours under reflux conditions at a sump temperature of 147° C., no hydrogen chloride has been split off.

EXAMPLE 15 (Comparative Example)

An isomer mixture of linear tetradecenes is hydroformylated free of isomerization in the presence of a rhodium-carbonyltriphenylphosphine complex (K. Bott, "Fette-Seifen-Anstrichmittel" [Greases-Soaps-Paints] 76:443 [1974]). The thus-obtained pentadecanal isomer mixture is hydrogenated under aminating conditions. The mixture of isopentadecylamine isomers is once again reacted with the pentadecanal isomer mixture to the Schiff base and the latter is hydrogenated to the mixture of isomers of diisopentadecylamine.

With the aid of 87.5 g. (0.20 mole) of this diisopentadecylamine, diluted with 87.0 g. of xylene, 56.0 g. of a hydrochloric acid solution is extracted containing 7.3 g. (0.20 mole) of hydrogen chloride. In this way, 182.9 g. of an upper, organic phase is obtained with 7.1 g. of hydrogen chloride and 47.2 g. of an aqueous phase with 0.2 g. of hydrogen chloride.

The upper phase is distilled as set forth in Example 4. Initially, 3.9 g. of water with 0.2 g. of hydrogen chloride is separated in this way, and thereafter the content of the flask is maintained for 20 hours under total reflux at a sump temperature of 150° C. while passing 10 l. of nitrogen per hour therethrough. During this time, a total of 1.1 g. of hydrogen chloride is collected in the washing bottles through which the nitrogen has been passed.

EXAMPLE 16

Diisopentadecylamine, the production of which has been described in Comparative Example 15, is reacted to the diisopentadecylmethylamine in accordance with Leuckart-Wallach. 100.0 g. of an aqueous hydrochloric acid solution containing 10.8 g. (0.296 mole) of hydrogen chloride is stirred together with 124.0 g. (0.275 mole) of diisopentadecylmethylamine. After allowing the reaction mixture to stand for some time, a supernatant, somewhat viscous amine-hydrogen chloride phase is separated, which contains the entire amount of the amine, 10.5 g. of hydrogen chloride, and 23.0 g. of water. In the lower, aqueous phase (66.4 g.), there is still found 0.3 g. of hydrogen chloride.

The supernatant phase (157.0 g.) is combined with 224.0 g. of xylene and distilled as set forth in Example 2. First of all, 22.4 g. of an aqueous condensate is thus separated with 0.7 g. of hydrogen chloride; thereafter, under total reflux and while passing 10 l. of nitrogen per hour through the reaction mixture, 9.8 g. of hydrogen chloride is collected during 8 hours in the washing bottles. To compare the rates at which the hydrogen chloride is split off from the solution in a secondary aliphatic amine (Example 15) and from the solution in a tertiary aliphatic amine (present example), Table 2 indicates the quantities of hydrogen chloride obtained after the indicated rectifying periods.

The data are set forth in percent, based on the amount of hydrogen chloride contained in the amount of solution passed on to the distillation:

TABLE 2

| HCl in the Aqueous Condensate | Diisopentadecylamine (for Comparison) 3.0 | Diisopentadecylmethylamine (According to Invention) 6.6 |
| --- | --- | --- |
| Gaseous HCl After | | |
| 1 Hour | 0.7 | 3.5 |
| 2 Hours | 1.5 | 15.0 |
| 3 Hours | 2.2 | 28.2 |
| 4 Hours | 2.7 | 42.0 |
| 5 Hours | 3.9 | 50.6 |
| 6 Hours | 5.0 | 79.5 |
| 7 Hours | 5.5 | 92.0 |
| 8 Hours | 7.1 | 93.0 |
| 10 Hours | 8.1 | 93.0 |
| 15 Hours | 12.5 | |
| 20 Hours | 16.4 | |

TABLE 2-continued

| HCl in the Aqueous Condensate | Diisopentadecyl-amine (for Comparison) | Diisopentadecyl-methylamine (According to Invention) |
|---|---|---|
| | 3.0 | 6.6 |
| HCl Total | 19.4% | 99.6% |

EXAMPLE 17 (Comparative Example)

A pentadecylamine isomer mixture produced as set forth in Example 15 is converted, in accordance with Leuckart-Wallach, into an isopentadecyldimethylamine isomer mixture. A solution of 58.3 g. (0.2 mole) of this isopentadecyldimethylamine and of 7.3 g. (0.2 mole) of hydrogen chloride in 100 g. of xylene is heated to reflux while passing 10 l. of nitrogen per hour therethrough. After an operating time of 7 hours at a sump temperature of 139° C., practically no hydrogen chloride at all, namely only 0.2 g., has been carried away by the nitrogen.

EXAMPLE 18

100.0 g. of hydrochloric acid solution containing 5.4 g. (0.148 mole) of hydrogen chloride is agitated together with 124.0 g. (0.275 mole) of diisopentadecylmethylamine. Three hours after the agitator has been turned off, two clear phases have separated from each other. The top phase, amounting to 146.7 g., contains 5.4 g. of hydrogen chloride; the lower, aqueous phase, amounting to 77.3 g., contains merely traces of hydrogen chloride (0.04%).

The upper phase is distilled after adding 150 g. of xylene in accordance with the mode of operation set forth in Example 4, thus obtaining 16.2 g. of an aqueous phase with 0.5 g. of hydrogen chloride and 4.8 g. of gaseous hydrogen chloride.

EXAMPLE 19

139.0 g. of an aqueous solution containing 13.0 g. of sodium chloride and 18.2 g. (0.5 mole) of hydrogen chloride is extracted by shaking once and then allowing the mixture to settle, in a separating funnel, together with 177.0 g. (0.5 mole) of tri-2-ethylhexylamine. In this way, 195.0 g. of a supernatant amine phase is obtained with 10.5 g. of hydrogen chloride and 120.7 g. of a lower phase with 7.3 g. of hydrogen chloride. During this experiment, 58% of the hydrogen chloride originally present in the aqueous phase is absorbed by the organic phase.

When repeating the experiment with an amount of xylene identical to the quantity of the amine, 93% of the hydrogen chloride is recovered in the organic phase (Comparative Experiment 3). This result shows that the extraction can be conducted advantageously in the presence of a water-immiscible solvent.

EXAMPLE 20

72.1 g. of an aqueous hydrochloric acid solution containing 9.1 g. (0.25 mole) of hydrogen chloride is extracted in a separating funnel with a mixture of 51.2 g. (0.25 mole) of N-octylaniline and 51.2 g. of xylene by shaking and allowing the mixture to settle. In this way, 114.9 g. of an upper organic phase is obtained with 8.0 g. of hydrogen chloride, as well as 59.1 g. of a lower aqueous phase which still contains 1.1 g. of hydrogen chloride.

The organic phase is distilled and rectified as described in Example 4. First of all, 5.4 g. of water is obtained with 0.3 g. of hydrogen chloride and then, during the course of 6 hours, 7.5 g. of gaseous hydrogen chloride is produced. The sump temperature rises gradually from 160° C. to 186° C. during this procedure.

EXAMPLE 21 (Comparative Example)

72.1 g. of an aqueous hydrochloric acid solution containing 9.1 g. (0.25 mole) of hydrogen chloride is shaken with a mixture of 51.2 g. (0.25 mole) of N,N-dibutylaniline and 51.2 g. of xylene and then left to phase separation, thus obtaining 57.6 g. of an organic phase and 116.8 g. of a lower aqueous phase. The organic phase does not contain any hydrogen chloride; the latter is recovered quantitatively in the aqueous phase wherein the dibutylaniline (as the hydrochloride) has also entered the solution.

N,N-Dibutylaniline and N-octylaniline (from Example 20) have the same molecular weight, but while N-octylaniline, with an octyl residue, is suitable for the extraction of hydrogen chloride, N,N-dibutylaniline, with two butyl residues, is unsuitable for this purpose.

EXAMPLE 22

In a shaker funnel, 128.3 g. of an aqueous solution containing 15.7 g. (0.43 mole) of hydrogen chloride and 8.1 g. of sodium chloride is extracted with a mixture of 88.0 g. (0.43 mole) of p-(2-ethylhexyl)-aniline and 88.0 g. of tert.-pentylbenzene, thus obtaining 221.8 g. of an upper phase with 15.1 g. of hydrogen chloride and 81.1 g. of a lower aqueous phase with 0.6 g. of hydrogen chloride. The upper phase is heated to reflux in accordance with Example 4 while passing 10 l. of nitrogen per hour therethrough. First of all, 30.1 g. of an aqueous phase is obtained with 0.8 g. of hydrogen chloride; thereafter, 13.7 g. of gaseous hydrogen chloride passes over during the course of 3.5 hours. The sump temperature rises during this time period gradually from 187° C. to 220° C.

EXAMPLE 23

72.1 g. of hydrochloric acid containing 9.1 g. (0.25 mole) of hydrogen chloride is mixed thoroughly with a mixture of 80.0 g. of N,N-dioctylaniline and 80.0 g. of xylene. During this step, 116.3 g. of a (moist) salt is obtained which is removed by filtration. The filtrate disintegrates into two phases; the lower aqueous phase, amounting to 60 g., still contains 1.6 g. of hydrogen chloride. The upper organic phase is combined with the filtered-off salt and distilled in a round flask equipped with a column, a water trap, and a condenser, while passing 10 l. of nitrogen per hour through the mixture, as set forth in Example 4. After the water that has been distilled over is separated, amounting to 9.5 g. with 1.0 g. of hydrogen chloride, 6.5 g. of gaseous hydrogen chloride is obtained.

EXAMPLE 24

31.7 g. of hydrochloric acid containing 4.0 g. (0.11 mole) of hydrogen chloride is mixed thoroughly with 47.2 g. of N,N-didodecylaniline and 47.2 g. of xylene. A white salt is immediately precipitated, weighing after filtration in the moist condition 78.0 g. The filtrate separates into two phases, the lower aqueous phase weighing only 10.1 g. and containing 0.9% of hydrogen chloride.

The upper phase is combined with the salt and further processed as set out in Examples 4 and 23, thus obtaining 16.0 g. of an aqueous distillate with 1.0 g. of hydrogen chloride and 3.0 g. of gaseous hydrogen chloride.

EXAMPLE 25

46.8 g. of an aqueous solution, containing 5.7 g. (0.157 mole) of hydrogen chloride and 3.0 g. of sodium chloride is extracted in a shaker funnel with a mixture of 40 g. (0.157 mole) of N-octyl-α-naphthylamine and 60.0 g of xylene, thus obtaining 105.8 g. of an upper phase containing 4.5 g. of hydrogen chloride, as well as 41.0 g. of a lower phase with 1.2 g. of hydrogen chloride. The upper phase is refluxed in accordance with Example 4 while passing 10 l. of nitrogen per hour therethrough. Initially, 2.3 g. of an aqueous distillate is obtained with 0.1 g. of hydrogen chloride, and then, 3.9 g. of gaseous hydrogen chloride is produced with a sump temperature which gradually increases from 146° C. to 156° C. during the course of 9 hours.

EXAMPLE 26

In a shaker funnel, 71.9 g. of an aqueous solution containing 9.1 g. (0.25 mole) of hydrogen chloride is extracted with a mixture of 88.0 g. (0.25 mole) of tri-2-ethylhexylamine and 88.0 g. of tert.-pentylbenzene, thus obtaining 186.9 g. of an upper phase with 7.5 g. of hydrogen chloride and 59.6 g. of a lower aqueous phase with 1.6 g. of hydrogen chloride. The upper phase is heated to boiling in accordance with the procedure of Example 1, but without passing nitrogen therethrough. The condensed vapors are recycled via a water trap in a conduit separated from the vapor chamber into the head of the column, thus obtaining 5 g. of aqueous condensate wherein 0.7 g. of hydrogen chloride is dissolved, and thereafter during the course of 3 hours at a sump temperature of 210° C., 5.2 g. of gaseous hydrogen chloride is produced.

We claim:

1. A process for the production of gaseous hydrogen chloride by extraction of dilute aqueous hydrochloric acid with amines, wherein:
   (a) aqueous hydrochloric acid is extracted with an amine selected from the group consisting of tertiary alkyl amines, tertiary aryl dialkyl amines, secondary arylalkyl amines, primary alkylaryl amines, or mixtures thereof, which contain 14–32 carbon atoms in the nitrogen-bound side chains, and among these at most one nitrogen-bound methyl group and at least one aliphatic group containing at least 6 carbon atoms, and wherein the acid constant $K_a$ of the amine is smaller than $10^{-3}$;
   (b) an inert, water-immiscible organic solvent which has a lower boiling point than the amine employed is added to the extract;
   (c) the extract is distilled, the vapors thus-formed are condensed, the water is continuously separated from the two-phase condensate, and the organic phase is returned into the distillation process; and
   (d) after removal of the water, the extract is distilled under reflux at sump temperatures of between about 100° C. and 250° C., and the gaseous hydrogen chloride liberated at the head of the column is withdrawn.

2. The process of claim 1, wherein said inert, water-immiscible solvents employed are selected from the group consisting of straight-chain or branched, aliphatic, cycloaliphatic, aromatic, or araliphatic hydrocarbons of 6–20 carbon atoms, as well as mixtures of these compounds, or corresponding petroleum fractions, and furthermore straight-chain dialkyl ethers, as well as cyclic ethers of 6–20 carbon atoms, cyclic or acyclic ketones branched in the α-position and having 6–20 carbon atoms, saturated or unsaturated perchlorinated aliphatic hydrocarbons of 2–6 carbon atoms, as well as chloro-, dichloro-, or nitrobenzene.

3. The process of claim 1, wherein step (d) is conducted at sump temperatures of between 120° C. and 230° C.

4. The process of claim 1, wherein the extraction is conducted with a quantity of the amine lying approximately 5–10% above the amount equivalent to the hydrochloric acid content.

5. The process of claim 1, wherein approximately the same parts by weight of amine and solvent are utilized.

6. The process of claim 1, wherein the solvent boils at least 20° C. lower than the amine.

7. The process of claim 1, wherein the solvent boils at least 30° C. lower than the amine.

8. The process of claim 1, wherein said dilute aqueous hydrochloric acid has a hydrochloric acid concentration lower than about 20%.

9. The process of claim 1, wherein said dilute aqueous hydrochloric acid has a hydrochloric acid concentration of about 2 to 20 percent by weight.

10. The process of claim 1, wherein said dilute aqueous hydrochloric acid has a hydrochloric acid concentration of about 5 to 15 percent by weight.

11. The process of claim 1, wherein the extraction is carried out with an inert gas flow.

12. A process for the production of gaseous hydrogen chloride by extraction of dilute aqueous hydrochloric acid with amines, wherein:
   (a) aqueous hydrochloric acid is extracted with a mixture of an amine and an inert organic solvent which is immiscible with water and has a lower boiling point than the amine employed, said amines selected from the group consisting of tertiary alkyl amines, tertiary aryl dialkyl amines, secondary arylalkyl amines, primary alkylaryl amines, or mixtures thereof, which contain 14–32 carbon atoms in the nitrogen-bound side chains, and among these at most one nitrogen-bound methyl group and at least one aliphatic group containing at least 6 carbon atoms, and wherein the acid constant $K_a$ of the amine is smaller than $10^{-3}$;
   (b) the extract is distilled, the vapors thus-formed are condensed, the water is continuously separated from the two-phase condensate, and the organic phase is returned into the distillation process; and
   (c) after removal of the water, the extract is distilled under reflux at sump temperatures of between about 100° and 250° C., and the gaseous hydrogen chloride liberated at the head of the column is withdrawn.

13. The process of claim 12, wherein said inert, water-immiscible solvents employed are selected from the group consisting of straight-chain or branched, aliphatic, cycloaliphatic, aromatic, or araliphatic hydrocarbons of 6–20 carbon atoms, as well as mixtures of these compounds, or corresponding petroleum fractions, and furthermore straight-chain dialkyl ethers, as well as cyclic ethers of 6–20 carbon atoms, cyclic or acyclic ketones branched in the α-position and having 6–20 carbon atoms, saturated or unsaturated perchlorinated aliphatic hydrocarbons of 2–6 carbon atoms, as well as chloro-, dichloro-, or nitrobenzene.

14. The process of claim 12, wherein step (c) is conducted at sump temperatures of between 120° C. and 230° C.

15. The process of claim 12, wherein the extraction is conducted with a quantity of the amine lying approximately 5–10% above the amount equivalent to the hydrochloric acid content.

16. The process of claim 12, wherein approximately the same parts by weight of amine and solvent are utilized.

17. The process of claim 12, wherein the solvent boils at least 20° C. lower than the amine.

18. The process of claim 12, wherein the solvent boils at least 30° C. lower than the amine.

19. The process of claim 12, wherein said dilute aqueous hydrochloric acid has a hydrochloric acid concentration lower than about 20%.

20. The process of claim 12, wherein said dilute aqueous hydrochloric acid has a hydrochloric acid concentration of about 2 to 20 percent by weight.

21. The process of claim 12, wherein said dilute aqueous hydrochloric acid has a hydrochloric acid concentration of about 5 to 15 percent by weight.

22. The process of claim 12, wherein the extraction is carried out with an inert gas flow.

* * * * *